United States Patent
Barrus et al.

(10) Patent No.: US 6,929,412 B1
(45) Date of Patent: Aug. 16, 2005

(54) RFID TAG, ANTENNA, AND PRINTER SYSTEM

(75) Inventors: Gordon B. Barrus, San Juan Capistrano, CA (US); Richard E. Schumaker, Orange, CA (US); Andrew W. Edwards, Irvine, CA (US); Duane C. Gibbs, Tustin, CA (US); Kevin Mark Smith, Irvine, CA (US); Rudy Concepcion Jr., Rancho Santa Margarita, CA (US)

(73) Assignee: Printronix, Inc., Irvine, CA (US)

( * ) Notice: Subject to any disclaimer, the term of this patent is extended or adjusted under 35 U.S.C. 154(b) by 0 days.

(21) Appl. No.: 10/863,055

(22) Filed: Jun. 7, 2004

Related U.S. Application Data

(63) Continuation-in-part of application No. 10/660,856, filed on Sep. 12, 2003.

(51) Int. Cl.[7] ............................................. B41J 11/44
(52) U.S. Cl. ........................... 400/76; 400/70; 400/61; 340/572.1; 340/572.7; 101/35
(58) Field of Search .............................. 400/61, 62, 70, 400/76; 340/572.1, 572.4, 572.6–572.8, 825.69, 340/825.72, 572; 343/702, 741, 850, 866, 343/873, 895; 101/35

(56) References Cited

U.S. PATENT DOCUMENTS

| | | | | |
|---|---|---|---|---|
| 5,682,143 A | * | 10/1997 | Brady et al. | 340/572.7 |
| 5,940,045 A | * | 8/1999 | Belcher et al. | 343/850 |
| 6,246,326 B1 | * | 6/2001 | Wiklof et al. | 340/572.1 |
| 6,327,972 B2 | * | 12/2001 | Heredia et al. | 101/35 |
| 6,329,915 B1 | * | 12/2001 | Brady et al. | 340/572.1 |
| 6,366,260 B1 | * | 4/2002 | Carrender | 343/866 |
| 6,621,417 B2 | * | 9/2003 | Duncan et al. | 340/572.1 |
| 6,812,905 B2 | * | 11/2004 | Thomas et al. | 343/853 |

* cited by examiner

*Primary Examiner*—Minh Chau
(74) *Attorney, Agent, or Firm*—MacPherson Kwok Chen & Heid LLP; Tom Chen

(57) ABSTRACT

An RFID label with embedded tag is passed through an RFID antenna in a printer system, where the RFID antenna allows a roll of such labels to pass in close proximity to the antenna and still allow each individual RFID tag to be read and/or programmed. The RFID antenna is formed with two parallel microstrip transmission lines coupled to an RF phase splitter there between.

29 Claims, 6 Drawing Sheets

RFID TAG, ANTENNA, AND PRINTER SYSTEM

CROSS-REFERENCE TO RELATED APPLICATIONS

This application is a continuation-in-part application of U.S. patent application Ser. No. 10/660,856, filed Sep. 12, 2003.

BACKGROUND

1. Field of the Invention

The present invention relates to printer systems, and in particular, a printer system for communicating with radio frequency identification (RFID) labels.

2. Related Art

RFID transponders or tags, either active or passive, are typically used with an RFID reader to read information from the RFID tag. The information is then stored or otherwise used in various applications, such as monitoring, cataloging, and/or tracking of the item associated with the RFID tag, paying tolls, and managing security access. For example, RFID tags can be obtained through companies such as Alien Technology Corporation of Morgan Hill, Calif. Many applications for bar codes can also be used in conjunction with RFID systems.

A conventional RFID tag and reader uses radio frequency signals to acquire data remotely from the tags within the range of the reader. One example is reading the information associated with a transponder carried in a car, which allows the RFID system to determine the number of times a car passes through an RFID reader mounted over a toll road. This information can then be processed and a bill may be sent to the owner of the transponder based on the number of times the toll road was used. Another example is reading information from a group of objects, such as a cart of groceries. Each grocery item would have an RFID tag or label, which may include the description and price of the item. An RFID reader can then read the entire cart of items, print out the item description and price, and total price. This is in contrast to bar code systems, in which a bar code scanner must be brought within sufficient range and direction to the bar code in order for a scanner to read each individual item. Yet another example is reading RFID tags on cartons stored on pallets as the pallets are moved through a warehouse. This allows efficient inventory tracking of arriving and/or departing items.

These and other typical RFID systems require antennas that are able to interrogate RFID tags that are many wavelengths away. Such antennas typically have large power and beam widths. These types of antennas are not suitable for use in applications that require directional and confined interrogation.

RFID labels, such as for cartons or pallets, can be produced by placing an RFID tag in a label, programming information into the tag, such as from a host computer, and based on the information, printing the label with a proper bar code and/or other printable information using a thermal printer. RFID labels can also be produced in a thermal printer by first printing on the label and then programming or encoding the RFID tag on the label. These labels can then be read by both a bar code scanner and an RFID reader. However, printing after programming forces additional handling of the roll of labels and requires the use of additional hardware. To ensure that the correct information is printed on a label, an RFID reader must be used to synchronize the thermal printing process with the associated RFID tag. Furthermore, the capabilities of programming and reading RFID tags used in thermal printer labels is limited, due in part, to the mechanical profile of the printer, which may cause performance issues with radio frequency signals associated with RFID technology, and to the proximity of multiple tags coupled with the need to address (program) only one tag at a time.

Accordingly, there is a need for printers and components that are able to process RFID labels that overcomes the deficiencies in the prior art as discussed above.

SUMMARY

According to one aspect of the invention, a thermal printer is used to read and write an RFID tag on a label and to print the label based on information read from the RFID tag. A pair of terminated microstrip transmission lines act as an antenna in one embodiment for interrogation of the RFID tag, with an operating frequency between 902 and 928 MHz. Such an antenna allows 1) the RF field to be controlled so that only the RFID tag associated with the label to be printed by the thermal print head is encoded, while not interrogating other RFID tags in a label roll, and 2) communication with an RFID tag as the label is moving across the antenna field.

According to one embodiment, a roll of blank labels includes an RFID tag embedded into each label. The roll is inserted into a thermal printer having a thermal print head and an RFID antenna located between the print head and the roll of RFID labels and underneath the path of the labels. The RFID tags can be programmed with known information, such as from a host computer, and verified that the programmed information is correct. When a tag is programmed or encoded, any existing data is first erased and the new information transmitted, via the RFID antenna, to the tag. A read operation then follows to verify that the correct information was written. In one embodiment, if a first read (verify) operation indicates an improperly programmed tag, additional write operations, each followed by a read (verify) operation, are performed before the RFID tag is considered defective. If the RFID tag is defective, an error notification can be given to the operator and the printing halted or the thermal print head can print onto the label with an indication that the RFID tag is defective.

This allows the printer to have the capability to program data into an RFID label and verify that correct data was programmed before printing. If an error is detected, the printer can over-strike the label, indicating an error in the tag.

According to another embodiment, the RFID tag is interrogated at decreasing RF power levels until a minimum power level is determined that still allows the RFID tag to be read. This allows the system to determine a level of RFID tag performance margin or RFID tag quality level.

Any data accumulated associated with the RFID tag can be stored and retrieved for later usage, such as the number of defective tags, the number of RFID tag retries needed for a successful write, and the minimum RF power level for an RFID tag.

According to yet another embodiment of the invention, information from a data stream from a host computer is intercepted, reconfigured, and used for programming or writing to the RFID tag. In one embodiment, bar code commands are extracted from the data stream. The bar code data is then formatted into an RFID command and the bar code data is subsequently programmed into the RFID tag, and the RFID tag is printed with the commands from the data stream. The bar code data may be manipulated to ensure compliance with the RFID tag capabilities. Modifying the bar code data stream into an RFID programming command eliminates the need to modify the host application software.

It is noted that some company's thermal printers can print labels based on other company's languages allowing easy migration into competitor applications. Thus, the concept of converting the bar code command into an RFID command can be applied to a thermal printer that supports not only its standard programming language but also any competitor languages that the printer happens to support.

This invention will be more fully understood in conjunction with the following detailed description taken together with the following drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

Figure 1:
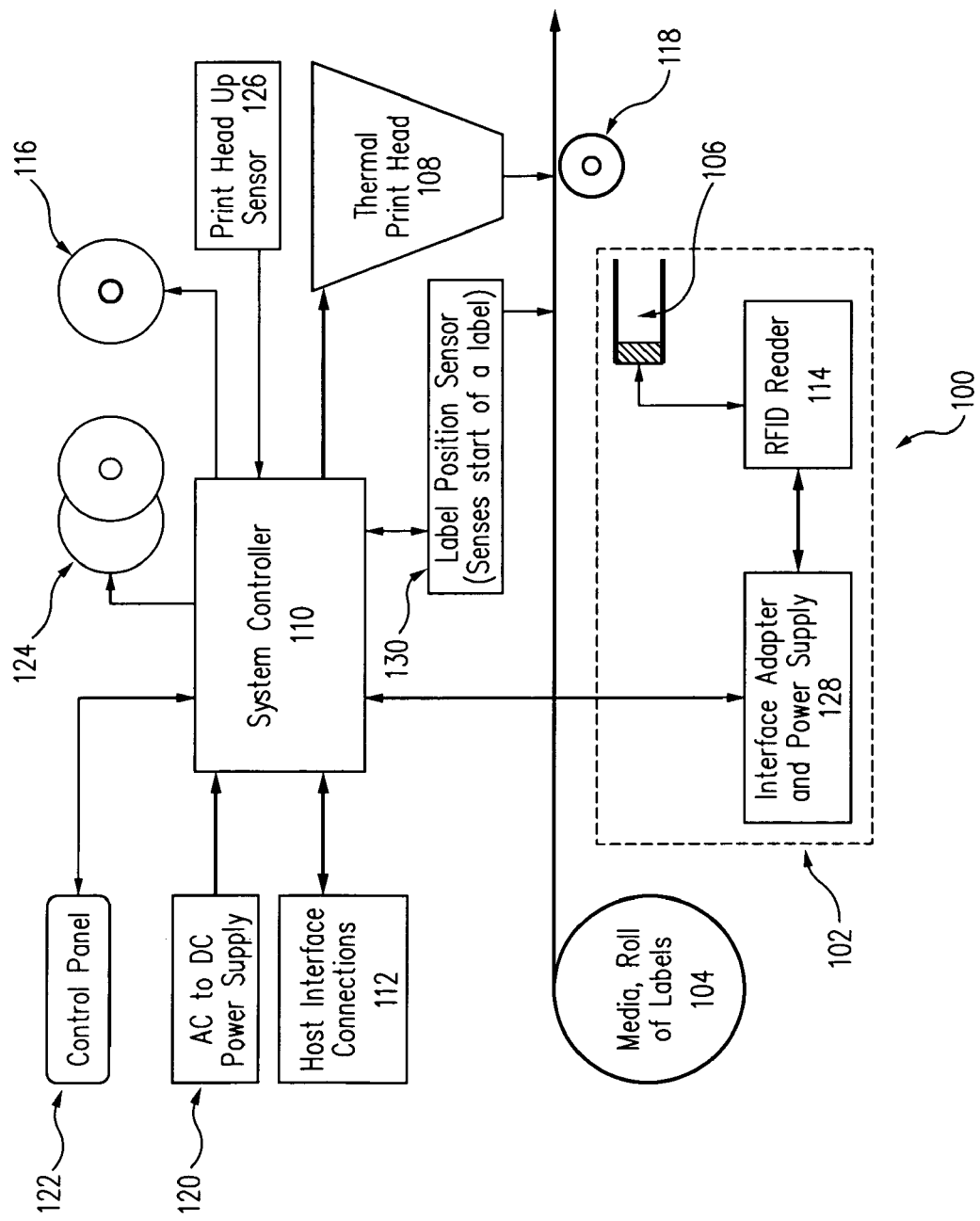
FIG. 1 shows a block diagram of a thermal printer system with the RFID subsystem installed according to one embodiment.

FIG. 1 shows a block diagram of a printer system 100 with a radio frequency identification (RFID) reader subsystem 102 according to one embodiment. Printer system 100 also includes a roll 104 of labels or media, where an RFID tag is embedded in each label. RFID tags are conventional passive tags, such as manufactured by Alien Technology Corporation. Labels from roll 104 are fed over an RFID antenna 106, interrogated, and printed by a thermal print head 108. A host computer 112 coupled to a system controller 110 that is in turn coupled to RFID reader subsystem 102, which includes antenna 106, allows the RFID tag on each label to be written to and verified. If the RFID tag was programmed correctly, the label passes through thermal print head 108 for printing. The resulting label then has both a printed media as well as a programmed RFID tag that can be read, such as with bar code scanners and RF readers, respectively.

Figure 2:
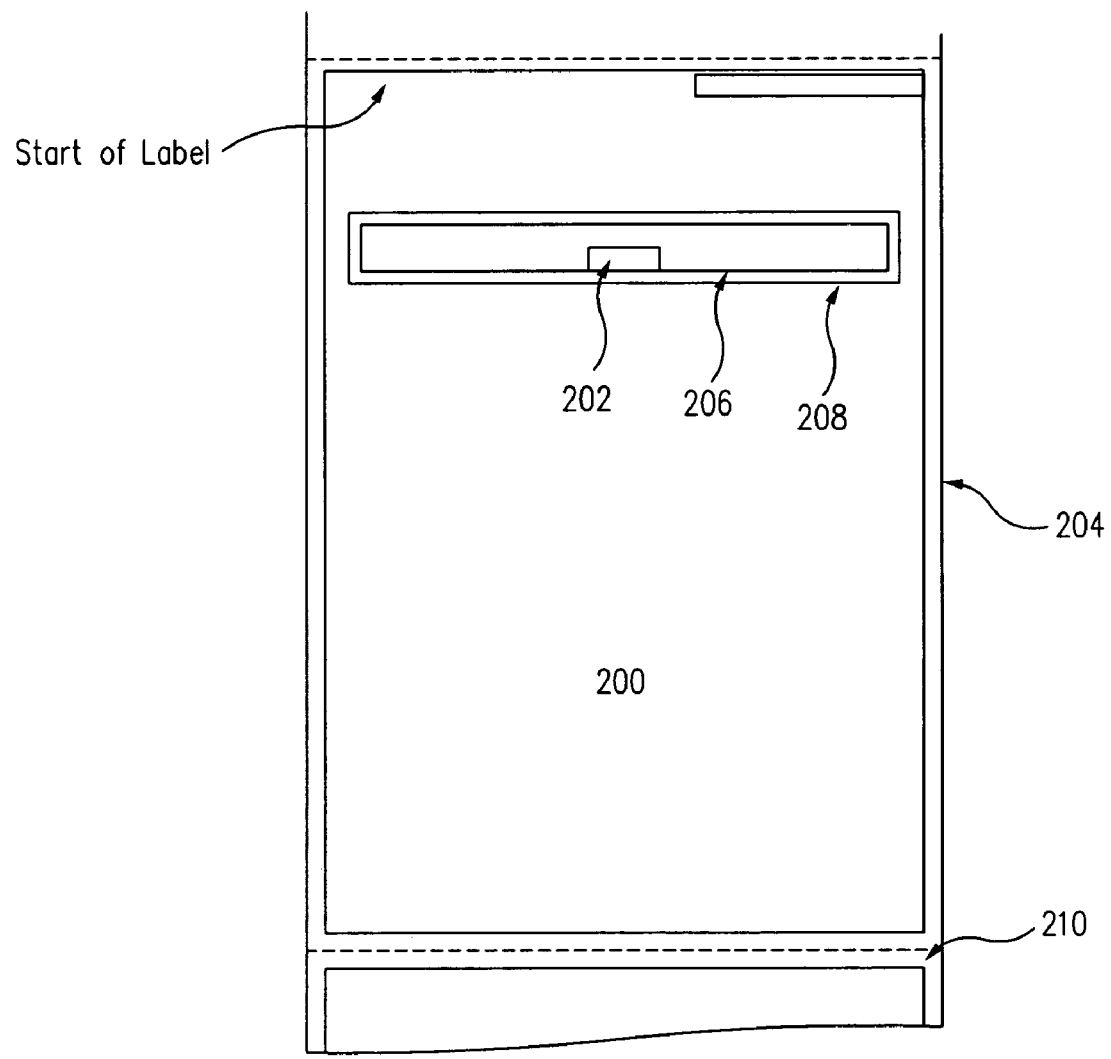
FIG. 2 shows a label with an RFID tag according to one embodiment.

FIG. 2 shows a label 200 from roll 104 of FIG. 1, where label 200 includes an RFID tag 202. RFID tag 202, in one embodiment, is embedded in label 200 between a layer of wax paper or liner 204 and the adhesive side of label 200. An outline of an RFID antenna 206, associated with RFID tag 202, is also shown, along with the outline of an RFID tag assembly (inlay) 208. RFID tag 202 is a conventional element, and RFID antenna 206 is discussed in more detail below. Also, as shown in FIG. 2, label 200 is one of many labels from roll 104, each label 200, can be separated from an adjacent label by a perforation 210. Perforation 210 allows labels to be easily separated after printing. Label 200 shown in FIG. 2 is a 4×6-inch label, although other size labels can also be used, such as 4×2 inch labels.

Referring back to FIG. 1, labels 200 from roll 104 pass over RFID antenna 106 for interrogation. In one embodiment, labels 200 pass at a speed of up to 10 inches per second, which for a 6-inch label is up to 5 labels every 3 seconds. A media drive motor 116, coupled to system controller 110, drives a platen 118 to pull labels 200 through the printer, as is known in the art. System controller 110 is also coupled to a power supply 120 and a user-operated control panel 122 that allows the user to control certain operations of the print system, as will be discussed below. System controller 110 also controls thermal ribbon drive motors 124 and receives information from a label position sensor 130, which allows system controller 110 to communicate the appropriate actions to other portions of the printer system. An interface adapter and power supply assembly 128 within RFID reader subsystem 102 provides power to RFID reader 114, which in turn powers RFID antenna 106. Interface adapter and power supply assembly 128 allows signals between system controller 110 and reader 114 to be received and transmitted.

Due in part to the small areas within a printer system, labels 200 are brought in close proximity to RFID antenna 106 during interrogation. A label position sensor 130 senses the start of a new label and conveys that information to system controller 110. In one embodiment, labels 200 pass within approximately 0.035 inches or less of RFID antenna 106. Thus, contrary to conventional antennas used for RFID tag interrogation having large beam widths, RFID antenna 106 of the present invention, according to one embodiment, is a pair of parallel terminated microstrip transmission lines operating 180 electrical degrees out of phase.

Figure 3:
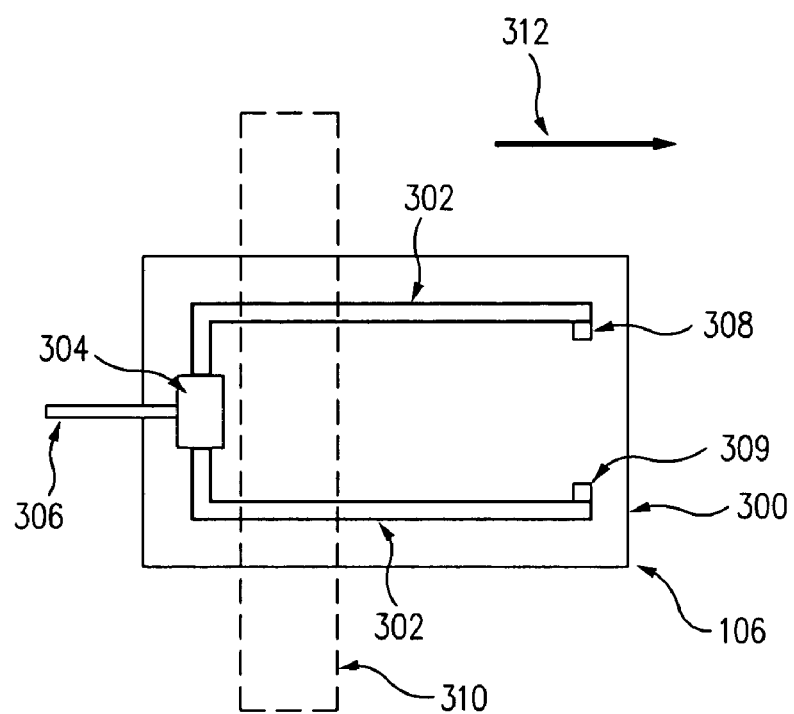
FIG. 3 shows an RFID antenna for use in the system of FIG. 1 according to one embodiment.

FIG. 3 shows RFID antenna 106 according to one embodiment. RFID antenna 106 includes two microstrip transmission lines 302 formed over a printed circuit board ground plane assembly 300. Both microstrip lines 302 are formed from copper embedded in a flexible dielectric material according to one embodiment, although other conductive materials may also be suitable. Microstrip lines 302 are driven by a phase splitter and impedance matching network 304 that is connected, in one embodiment, to a 50 ohm coaxial cable 306, which is coupled to RFID reader 114 (as shown in FIG. 1). The two outputs of the phase splitter and impedance matching network 304 produce signals 180° out of phase and are electrically connected to the two transmission lines by means of two short printed circuit etch runs. Network 304 also matches the 50 ohm characteristic impedance of the coaxial cable 306 to the 100 ohm impedance of each transmission line 302. The microstrips are electrically terminated by 100 ohm resistors 308 and 309. In one embodiment each transmission line 302 is 1.8 inches in length and the two transmission lines are separated from each other by 0.8 inches over the surface of printed circuit board assembly 300. Although referred to as "microstrips", any suitable set of parallel transmission lines may be used for the RFID antenna.

In one embodiment, coaxial cable 306 is electrically connected to RFID reader 114. Shown in FIG. 3 by dotted lines 310 is the outline of RFID tag assembly 208, which moves over RFID antenna 106 along the direction of an arrow 312 in one embodiment. In another embodiment the direction of RFID tag 208 movement over antenna 106 is reversed relative to arrow 312. In either embodiment, transmission lines 302 are parallel to the motion of the RFID label (and the RFID tag) as it passes by RFID antenna 106. As a result, communication with the tag while the label is in motion is possible. This capability supports increased throughput since the media does not have to be stopped while the RFID tag is programmed.

The RFID antenna used in the present invention is designed to meet the specific requirements of the application, e.g., reading and writing RFID tags in a small area with hundreds of RFID labels in close proximity to each other, i.e., in a roll. Such an antenna provides numerous advantages in these types of applications. For example, utilization of dual terminated radio frequency transmission lines 302 provides controlled radio frequency coupling between an RFID tag 202 and an RFID reader 114. Further, the physical length of transmission lines 302 can be altered by a simple design change to control the longitudinal distance over which communications can be maintained with the RFID tag. This feature allows easy adaptation of the RFID reader system to RFID labels of varying length as well as to variations in the actual longitudinal position of the RFID tag within the physical label. In addition, the use of a transmission line to couple to the RFID tag provides for a tight control over stray radio frequency fields, and therefore minimizes the effects of the surrounding printer metallic structure upon RFID system performance.

In one embodiment, the operating frequency of RFID reader 114 (from FIG. 1) is time varying (frequency hopping) between approximately 902 and 928 MHz inclusive in the ultra high frequency (UHF) band. Frequency hopping is known and is required by regulatory agencies such as the Federal Communications Commission (FCC) in order to minimize interference. This frequency range has a wavelength in free space between 13.9" and 12.73" inclusive. Other suitable RFID frequencies include 13.46 MHz in the HF band, 860 MHz in the UHF band, and 2.45 GHz in the UHF band.

As mentioned above, the RFID tags pass very close to the RFID antenna (e.g., 0.035 inch). This is in sharp contrast to conventional RFID tag antennas, which are designed to operate at multiple wavelength distances between the RFID tag and the RFID receiver. These conventional applications required the RFID tags to be read at a much larger distance. Consequently, these RFID antennas are designed for use at a distance of multiple wavelengths of the operating frequency. However, in the present invention, the interrogation distance as the RFID tag or label passes through the controlled RF field radiating from the microstrip transmission lines is just a small fraction of the RF signal wavelength. For example, in one embodiment where the distance between the RFID antenna and the RFID tag is 0.035 inch and the operating wavelength is 12.73 inches, the distance is approximately 0.0027 wavelengths. In order to maximize performance, the microstrip transmission lines are designed to have an impedance that matches the output of the phase splitter 304 when an RFID tag is in close proximity to the antenna. Furthermore, at these close distances and speeds of up to 10 inches per second, the RFID antenna must be able to accurately read from and write to the RFID tag as it passes through the RF field. The close distances also require that the RFID antenna be able to properly read from and write to RFID tags in the presence of various metallic structures within the thermal printer itself.

Other issues include the fact that there may be hundreds of RFID tags or labels in a roll, all of which are in close proximity to the RFID antenna and reader. Therefore, the RF field of RFID antenna must be controlled so that only the RFID tag passing over the RFID antenna is read/programmed and only the corresponding label is printed. Interrogation with one label should not affect any of the other RFID labels or tags, either within the roll or outside the roll. This would require a narrow RF field pattern; however, the RF field pattern from the RFID antenna must not be so narrow that communication is not possible when the RFID tag is positioned over a distance of about 1.05 inches. This distance results from the tolerances associated with the actual longitudinal positioning of the RFID label 206 in label 200 and the tolerances associated with the positioning of the label relative to the thermal print head 108. The label position is based upon the signal from the label position sensor 130 that is sent to system controller 110. Further, because the RF frequency is not fixed (i.e., it is frequency hopped over 902 and 928 MHz), the RFID antenna should have broadband characteristics in order to be efficient over the operating frequency range.

Microstrip transmission lines 302 are designed and positioned to provide efficient coupling to RFID tags such as RFID tag 202 over the 902 to 928 MHz frequency range. To achieve the foregoing requirements, RFID antenna 106 is designed as a pair of microstrip transmission lines operating 180 electrical degrees out of phase with respect to each other, such as shown in FIG. 3. In one embodiment, the microstrip elements are encapsulated in a flexible dielectric material and separated from a printed circuit board ground plane by a second layer of dielectric material. In one embodiment, microstrip transmission lines 302 is a flex circuit that places a polyimide dielectric around the copper transmission lines, i.e., the copper circuits are sandwiched between two layers of polyimide. Therefore, the dielectric in contact with the copper lines is separate from the dielectric spacer (second layer of dielectric) that separates the flex circuit transmission line assembly from the printed circuit board ground plane. In the embodiment described with respect to and shown in FIG. 3, RFID antenna 106 can be used in a system for interrogating RFID tags (inlays) of varying widths and lengths. By altering the physical length of the microstrip transmission lines, the longitudinal distance over which communications can be maintained with an RFID tag can be adjusted.

Figure 4:
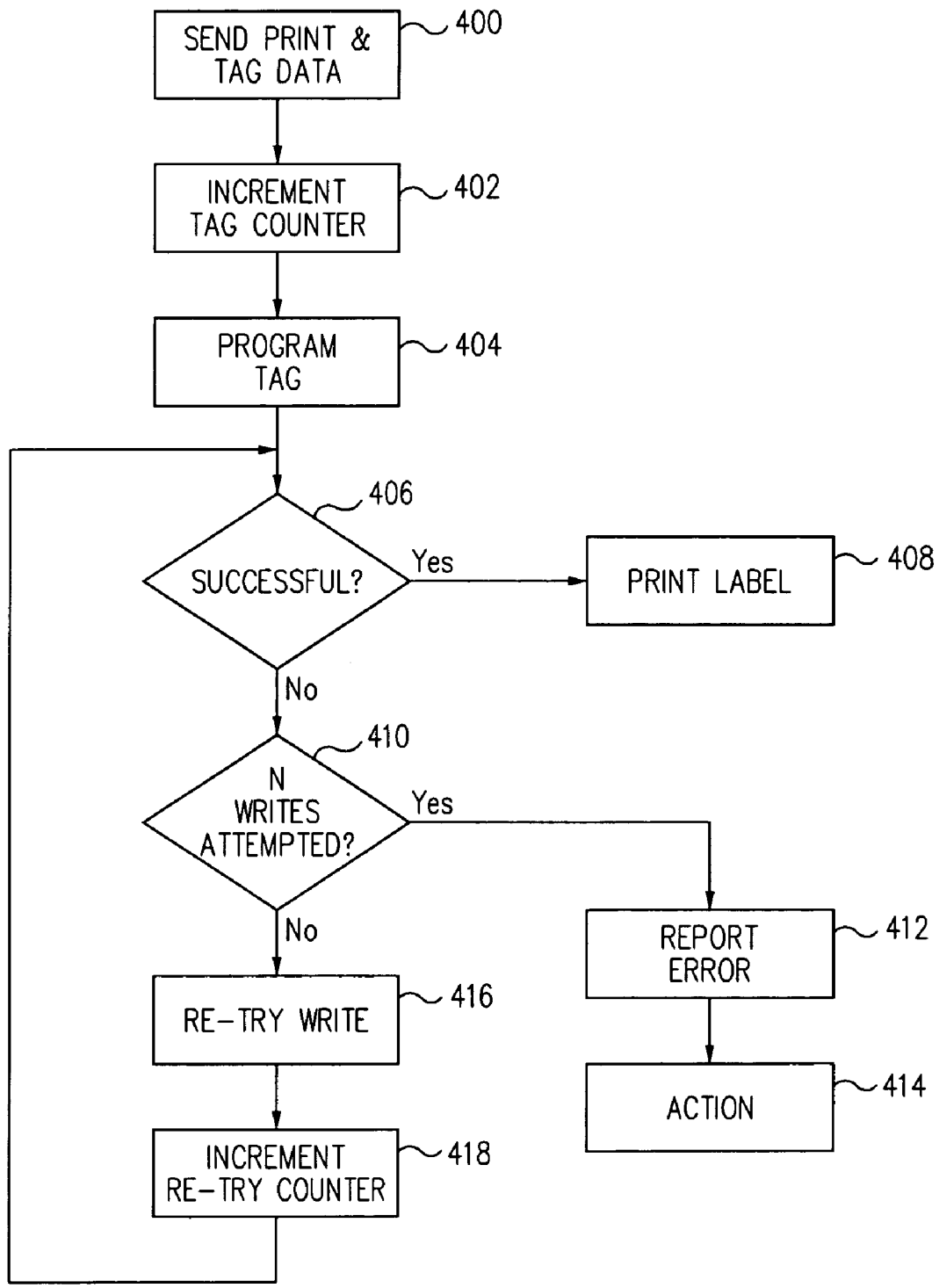
FIG. 4 is a flow chart showing a process for writing to and printing on a label according to one embodiment.

FIG. 4 is a flow chart showing steps used during a programming and printing of RFID label 200 according to one embodiment. In step 400, the host computer sends print image and tag data in one file to the printer. A counter is incremented, in step 402, to indicate that a new tag or label is passing through for processing. Data is then written onto the RFID tag via RFID circuitry and the RFID antenna in step 404. The write or programming operation is checked to determine if the data was written correctly in step 406. If the programming operation was successful, the label is printed in step 408, such as by a thermal print head. However, if the programming operation was not successful, the system determines if a certain number N of write operations have been attempted on the specific label in step 410. In one embodiment, N is between 1 and 5 and can be set by the user. If the number of attempts has reached N (i.e., N unsuccessful writes), an error is designated in step 412. The appropriate action is then taken in step 414. In one embodiment, the user can select one of two actions. The first action is halting operation of the printing process until the user re-starts the process. The second action is continuing the process by over-striking the label with an indication that the label is defective.

If, as determined in step 410, the maximum number of attempts has been reached, the system attempts a re-write of the same information on the next label in step 416. A counter for the number of write attempts on each label is incremented in step 418, and the programming operation is again verified in step 406.

Figure 5:
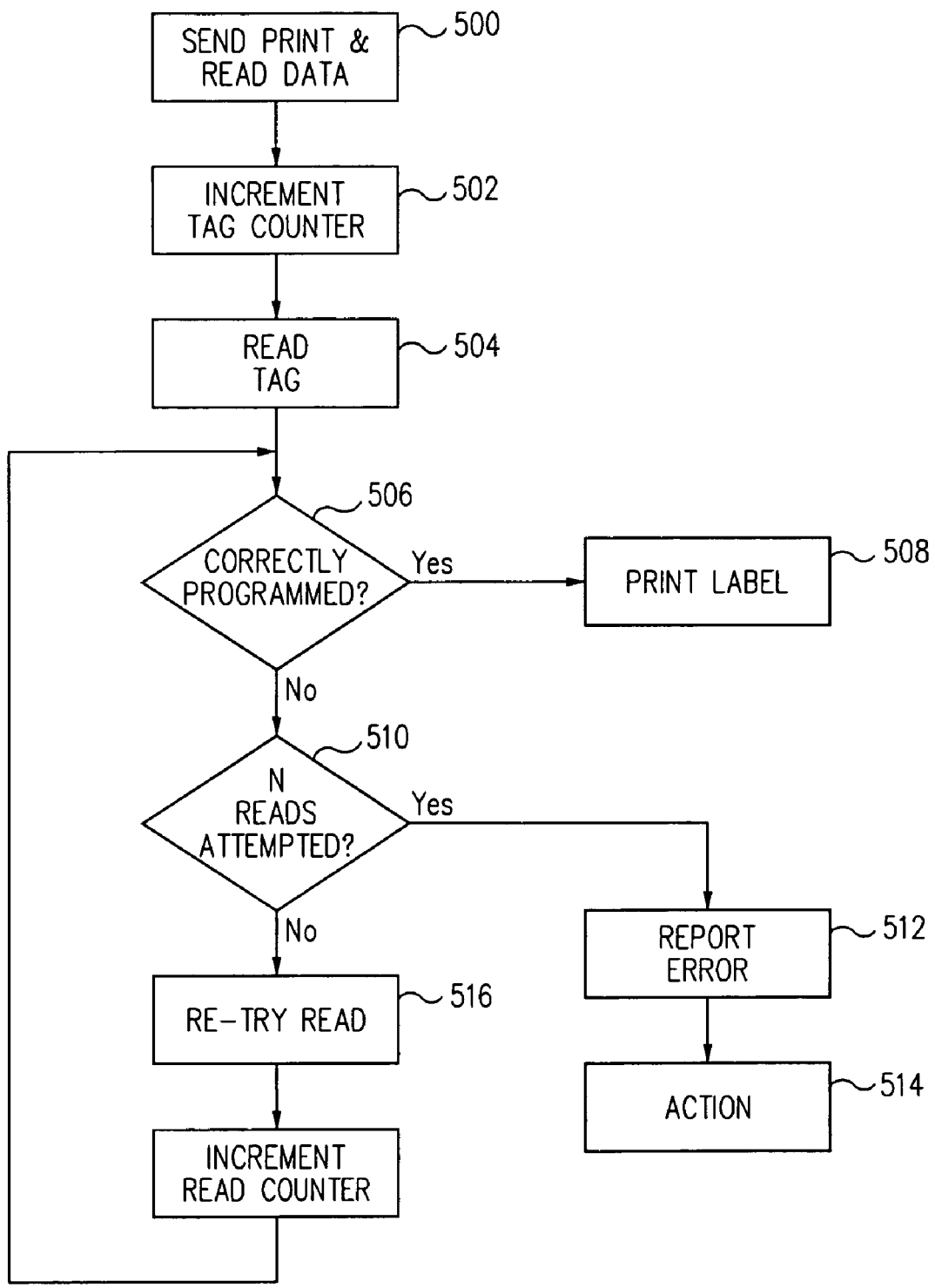
FIG. 5 is a flow chart showing a process for reading from and printing on a label according to one embodiment.

FIG. 5 is a flow chart showing steps used during a reading and printing of RFID label 200 according to one embodiment. In this embodiment, the RFID label has been pre-programmed. In step 500, the printer system is sent print image instructions and a read command to read the RFID tag. Next, a label counter is incremented in step 502, which counts the number of RFID labels passing through the printer. As the RFID label passes over the RFID antenna, the RFID tag within the label is read, in step 504. The printer system then determines, in step 506, if the information read from the RFID tag is what should be programmed, i.e., if there is an error with the programming. If the data in the tag is correct, the label is printed with image data from a thermal print head in step 508. However, if the read operation determines, in step 510, that the data stored in the tag is in error or cannot be read, the printer system determines if a certain number N read attempts have been made on the RFID label. In one embodiment, N is between 1 and 5, as determined by the user. If there has been N read attempts, an error in the tag is noted in step 512. Next, an appropriate action is taken in step 514. In one embodiment, the user can select whether the printing stops until the user re-starts the process or the printing continues with a thermal print head over striking the label to indicate a faulty RFID tag.

If, in step 510, the number of read attempts has not reached N, another read operation on the RFID tag is performed in step 516. A read counter indicating the number of read attempts on the tag is then incremented in step 518. The information in the tag is again checked for proper programming. Multiple read attempts allow the printer system to designate a faulty label with a higher level of confidence since some reads may not properly read the tag data, due to various factors, including interference from other sources.

Labels are advanced from the roll of labels for processing on the next RFID label. Processing continues until an end-of-label indicator is reached, the required number of labels have been printed, or the user halts operation, such as when a faulty label is encountered or a job needs to be interrupted.

Figure 6:
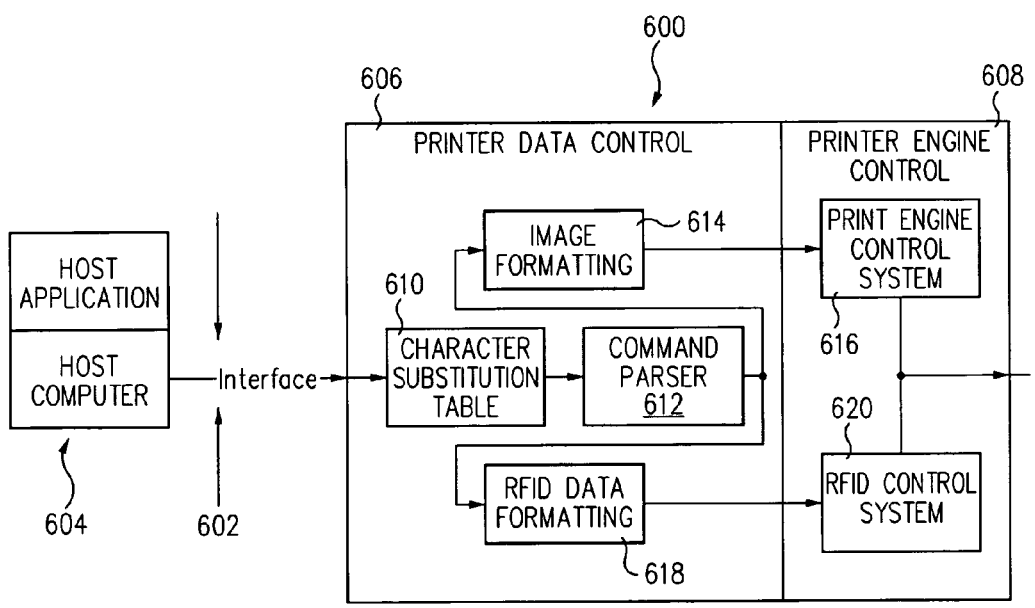
FIG. 6 is a block diagram of a printer system for extracting commands from a data stream and printing and programming a label according to one embodiment of the invention.

FIG. 6 is a block diagram showing a printer system 600 that extracts information from a data stream, transforms or converts portions of the data stream, if needed, and uses the portion to program the RFID tag, while also printing the label in the normal manner. In one embodiment, the portion is the bar code command. Printer system 600 receives information via a data stream 602 from a host computer 604 that includes a host application, typically specific to the system through an electrical and software interface. The electrical interface can be any suitable communication means, such as, but not limited to, a serial or parallel physical link, an Ethernet connection, or a wireless link. The data stream contains various commands, such as line, box, font, and bar code commands, for printing lines, boxes, text, bar codes, and other images. The data stream is transmitted to the printer in specific languages to cause the printer to print an image on a label or other media.

Typically, each manufacturer uses a unique and specific language or software interface, such as PGL (Programmable Graphics Language used and supported by Printronix of Irvine, Calif.), ZPL (Zebra Programming Language used and supported by Zebra Technologies of Illinois), and IPL (Intermec Programming Language used and supported by Intermec of Washington). To add RFID tag programming capability to the printer, additional printer language commands must be developed. Further, in the normal situation these commands would have to be integrated into host software application, at significant cost and effort, in order for the printer to deliver programmed RFID tags. In one embodiment, the data encapsulated in the bar code command is also programmed into the RFID tag. In this situation, the host application need not be modified when used in conjunction with additional software embedded in the printer. The additional printer software detects the bar code command from the incoming data stream and generates RFID specific commands which include the bar code data. These in turn are routed to the RFID system for programming into the RFID label.

In FIG. 6, printer 600 includes a printer data control section 606 that receives the data stream and a printer engine control section 608 for programming and printing the RFID label. Character substitution table 610, within printer data control section 606, is coupled to receive the data stream from host computer 604. Character substitution table 610 intercepts any incoming bar code command, identifies the bar code of interest, transmits this bar code command to a printer command parser 612 for normal bar code printing, and in addition creates an RFID write command to allow programming of the RFID tag. Character substitution table 610 is a distinct software application that is downloaded to the printer to effect the data manipulation. The data manipulation can be diverse. In one embodiment, character substitution table 610 pre-parses the incoming data stream to identify the specific bar code command of interest and associated bar code data. The bar code data is extracted from the bar code command and applied to the RFID write-tag command. The resulting data string is transmitted to command parser 612 for normal command processing. The bar code command is also sent to command parser 612 according to conventional methods, as is known in the art.

Printer command parser 612 identifies the print commands and transmits the print commands to an image formatter software module 614. Image formatter 614 processes the print commands such as to create a bit image of the desired print format. This bit image is transmitted to a print engine control system 616, within printer engine control 608, which manages the printer components (e.g., the print head, ribbon motors, platen motor and roller, sensors, etc.) to cause a printed image to be created on the label.

In parallel with this print process, command parser 612 also transmits the RFID specific commands to an RFID data formatting software module 618. This module formats the RFID data (or bar code data as was) sent with the RFID command to meet the formatting requirements of the RFID tag. In turn, this formatted RFID data is sent to an RFID control system 620, within printer engine control 608, which includes an RFID reader (or transceiver) capable of programming the RFID tag embedded within the label. The reader is attached to the antenna described above. The result is an RFID label that has been printed with images, as well as an RFID tag programmed with information from the data stream. This allows users to use their existing bar code application for RFID tags without extensive and costly modifications of the host computer application software.

In one embodiment, this same technique can be applied to thermal print systems that support more than one thermal printer language. The character substitution table can be configured to identify, for example, Zebra ZPL language bar code commands. Converting the bar code command from the data stream into an RFID command for programming the RFID tag can be utilized in systems that support various programming languages, such as from Zebra, Intermec, etc.

According to one embodiment, the bar codes can be supported in two modes, a copy mode and a transform mode. In the copy mode, an RFID tag with the exact information in the bar code is created, with a possible exception of checksum data. The checksum data may be supplied with the data or calculated by the printer. If calculated or generated by the printer, the checksum data is not present in the RFID tag. In the transform mode, data in the bar code is transformed before encoding into a tag. Two types of bar codes suitable for the invention are Integrated Two of Five (ITF) and Code 128C, although other codes may also be used. In the transform mode, data encoded in a bar code may be copied or programmed directly onto an RFID tag, but not printed on the label. This may be the application where the RFID tag data is not related to or supplements any of the printed bar code data. Data from the bar code may also be programmed exactly onto the RFID tag, except for the checksum and an application identifier or other type code.

Printer system 100 can be a standard thermal printing system, such as the T5000 from Printronix of Irvine, Calif. The RFID antenna and reader may be installed into the existing printer system to obtain the advantages discussed above of the present invention. Further, a simple modification of inserting a character substitution table into the existing code of the printer allows a printer to achieve the advantages discussed herein.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A printer system, comprising:
a roll of labels, wherein each label comprises a radio frequency identification (RFID) tag;
an RFID reader system comprising:
an RFID reader; and
an RFID antenna coupled to the RFID reader, wherein the RFID antenna comprises:
two non-overlapping parallel transmission lines; and
a phase splitter coupled between the two transmission lines; and
a print head, wherein the RFID antenna is between the roll of labels and the print head.

2. A printer system, comprising:
a roll of labels, wherein each label comprises a radio frequency identification (RFID) tag;
an RFID reader system comprising:
an RFID reader; and
an RFID antenna coupled to the RFID reader, wherein the RFID antenna comprises:
two parallel transmission lines;
a resistor coupled to an end of each of the two transmission lines; and
a phase splitter coupled between the two transmission lines; and
a print head, wherein the RFID antenna is between the roll of labels and the print head.

3. A printer system, comprising:
a roll of labels, wherein each label comprises a radio frequency identification (RFID) tag;
an RFID reader system comprising:
an RFID reader; and
an RFID antenna coupled to the RFID reader, wherein the RFID antenna comprises:
two parallel transmission lines; and
a phase splitter coupled between the two transmission lines, wherein the transmission lines are orientated parallel to a path of the roll of labels across the RFID antenna; and
a print head, wherein the RFID antenna is between the roll of labels and the print head.

4. The printer system of claim 3, wherein the transmission lines are RF transmission lines and the phase splitter is an RF signal phase splitter.

5. The printer system of claim 3, further comprising a coaxial cable coupling the RFID reader to the RFID antenna.

6. The printer system of claim 3, wherein the print head is a thermal print head.

7. The printer system of claim 3, wherein the RFID tag is located in an approximately middle section of the label along the width-wise direction.

8. The printer system of claim 7, wherein the RFID tag can be located in any lengthwise position in the label.

9. The printer system of claim 3, wherein the roll of labels moves under the print head to allow writing to and reading from the RFID tags during the moving.

10. The printer system of claim 3, wherein the length of the transmission lines can be changed to control longitudinal write and read distances of the RFID tag.

11. The printer system of claim 3, wherein the RFID reader system writes to and reads from the RFID tag.

12. The printer system of claim 3, wherein the RFID reader system operates in a frequency range of approximately 902 MHz to 928 MHz.

13. The printer system of claim 3, wherein the two transmission lines are formed from a conductive material.

14. The printer system of claim 13, wherein the conductive material is copper.

15. The printer system of claim 13, wherein the RFID antenna further comprises a printed circuit board ground plane, wherein the two transmission lines are secured above the printed circuit board ground plane.

16. The printer system of claim 15, further comprising a dielectric layer separating the printed circuit board ground plane from the two transmission lines.

17. The printer system of claim 3, wherein the RFID antenna further comprises a printed circuit board ground plane and a dielectric layer, wherein the dielectric layer is between the two transmission lines and the printed circuit board ground plane.

18. The printer system of claim 17, wherein the two transmission lines are encapsulated in a second dielectric layer.

19. A printer system, comprising:
a roll of labels, wherein each label comprises a radio frequency identification (RFID) tag:
an RFID reader system comprising:
an RFID reader; and
an RFID antenna coupled to the RFID reader, wherein the RFID antenna comprises:
two parallel transmission lines; and
a phase splitter coupled between the two transmission lines, wherein the two transmission lines are approximately 180 electrical degrees out of phase with respect to each other; and
a print head, wherein the RFID antenna is between the roll of labels and the print head.

20. A printer system, comprising:
  a roll of labels, wherein each label comprises a radio frequency identification (RFID) tag;
  an RFID reader system comprising:
    an RFID reader; and
    an RFID antenna coupled to the RFID reader, wherein the RFID antenna comprises:
      two parallel transmission lines formed from a conductive material;
      a printed circuit board ground plane, wherein the two transmission lines are secured above the printed circuit board ground plane; and
      a phase splitter coupled between the two transmission lines, wherein the phase splitter is further secured to the printed circuit board ground plane; and
  a print head, wherein the RFID antenna is between the roll of labels and the print head.

21. An RFID antenna for use in a printer system for printing RFID labels, the system including an RFID reader coupled to the RFID antenna and RFID labels passing in close proximity to the RFID antenna, the RFID antenna comprising:
  a dielectric layer;
  two parallel transmission strips located above a top surface of the dielectric layer, wherein the two transmission lines are approximately 180 electrical degrees out of phase with respect to each other; and
  a phase splitter coupled between the two transmission strips.

22. The RFID antenna of claim 21, further comprising a coaxial cable coupled to the phase splitter and the RFID reader.

23. The RFID antenna of claim 21, wherein the two transmission strips comprise a conductive material.

24. The RFID antenna of claim 21, further comprising a second dielectric layer encapsulating the two transmission strips.

25. The RFID antenna of claim 21, further comprising a ground plane, wherein the dielectric layer is between the ground plane and the two transmission strips.

26. The RFID antenna of claim 25, further comprising a second dielectric layer encapsulating the two transmission strips.

27. An RFID antenna for use in a printer system for printing RFID labels, the system including an RFID reader coupled to the RFID antenna and RFID labels passing in close proximity to the RFID antenna, the RFID antenna comprising:
  a dielectric layer;
  two parallel transmission strips located above a top surface of the dielectric layer; and
  a phase splitter coupled between the two transmission strips; and
  two resistors each coupled between the ends of the two transmission strips and a printed circuit board ground plane.

28. The RFID antenna of claim 27, wherein the phase splitter is coupled to the other ends of the two transmission strips.

29. An RFID antenna for use in a printer system for printing RFID labels, the system including an RFID reader coupled to the RFID antenna and RFID labels passing in close proximity to the RFID antenna, the RFID antenna comprising:
  a dielectric layer;
  two non-overlapping parallel transmission strips located above a top surface of the dielectric layer; and
  a phase splitter coupled between the two transmission strips.

* * * * *